(12) United States Patent
Suzuki et al.

(10) Patent No.: US 9,036,453 B2
(45) Date of Patent: May 19, 2015

(54) OBSTACLE DETECTION DEVICE

(75) Inventors: Ryotaro Suzuki, Tokyo (JP); Satoru Inoue, Tokyo (JP); Yukio Nishimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 604 days.

(21) Appl. No.: 13/394,307

(22) PCT Filed: Nov. 17, 2009

(86) PCT No.: PCT/JP2009/006155
§ 371 (c)(1),
(2), (4) Date: Mar. 5, 2012

(87) PCT Pub. No.: WO2011/061785
PCT Pub. Date: May 26, 2011

(65) Prior Publication Data
US 2012/0170411 A1  Jul. 5, 2012

(51) Int. Cl.
G01S 15/93    (2006.01)
G01S 15/87    (2006.01)
G01S 7/527    (2006.01)
G01S 15/10    (2006.01)

(52) U.S. Cl.
CPC ............. *G01S 15/931* (2013.01); *G01S 15/10* (2013.01); *G01S 15/878* (2013.01); *G01S 7/5276* (2013.01); *G01S 2015/939* (2013.01)

(58) Field of Classification Search
CPC ....... G01S 15/93; G01S 15/878; G01S 15/10; G01S 15/931; G01S 2015/939; G01S 7/5276
USPC ............................ 367/122, 127; 340/903, 943
See application file for complete search history.

(56) References Cited

U.S. PATENT DOCUMENTS

| | | | | |
|---|---|---|---|---|
| 3,953,823 | A | * | 4/1976 | Katakura ..................... 367/90 |
| 4,644,513 | A | * | 2/1987 | Czajkowski ................. 367/108 |
| 5,805,527 | A | * | 9/1998 | Hoashi et al. ................ 367/99 |

FOREIGN PATENT DOCUMENTS

| | | |
|---|---|---|
| JP | 62-022092 A | 1/1987 |
| JP | 5-333148 A | 12/1993 |
| JP | 5-346466 A | 12/1993 |
| JP | 07-198837 A | 8/1995 |
| JP | 11-326513 A | 11/1999 |
| JP | 2004-251727 A | 9/2004 |
| JP | 2007-278805 A | 10/2007 |

* cited by examiner

*Primary Examiner* — Luke Ratcliffe
*Assistant Examiner* — Hovhannes Baghdasaryan
(74) *Attorney, Agent, or Firm* — Birch, Stewart, Kolasch & Birch, LLP

(57) ABSTRACT

An obstacle detection device includes one or more emitter ultrasonic sensors, each emitting an ultrasonic wave toward an obstacle, and one or more detection ultrasonic sensors for reception, each detecting a reflected wave from the obstacle. A control unit drives a specific one of the emitter ultrasonic sensors to cause it to emit an ultrasonic wave, stops the emission of the ultrasonic wave by the specific emitter ultrasonic sensor at the time that one of the detection ultrasonic sensors detects a reflected wave from the obstacle, and carries out detection of the obstacle and measurement of the distance to the obstacle from the time that the control unit stops the emission of the ultrasonic wave by the emitter ultrasonic sensor and the time that the reflected wave cannot be detected anymore.

3 Claims, 10 Drawing Sheets

(a) Driving Pulses (b) Reflected Signal (Displayed in the Form of Full-Wave Rectified Waveform)

(c) Measurement Time

OBSTACLE DETECTION DEVICE

FIELD OF THE INVENTION

The present invention relates to an obstacle detection device which detects an obstacle and which is suitable particularly for use in a moving object, such as a vehicle.

BACKGROUND OF THE INVENTION

Conventionally, as obstacle detection devices, a laser radar which uses a laser beam, a microwave radar which uses a microwave, a capacitance type sensor which detects an obstacle from a change in its capacitance, an ultrasonic sensor which uses a ultrasonic wave, etc. are put in practical use. A cheap and reliable ultrasonic sensor, among these devices, is used for a purpose, such as a corner sensor mounted in a vehicle, of detecting an obstacle at a relatively-short distance from the sensor.

Conventionally, many techniques of detecting an obstacle by using an ultrasonic sensor have been proposed. For example, patent reference 1 discloses a technique of transmitting an ultrasonic wave, carrying out a time division process of dividing a transmission pulse time interval by the number of ultrasonic sensors for reception, and switching between output signals by using the two or more ultrasonic sensors for transmission and for reception.

RELATED ART DOCUMENT

Patent Reference

Japanese Unexamined Patent Application Publication No. 2007-278805

SUMMARY OF THE INVENTION

According to the technique disclosed by patent reference 1, the plurality of ultrasonic sensors for use in both transmission and reception are arranged, and detection of an obstacle is carried out individually by switching among these ultrasonic sensors sequentially with time. Therefore, detection of an obstacle cannot be carried out unless the time interval T=the detection time (maximum detection distance)×the number of sensors has been waited after previous detection was done. More specifically, a problem is that because it is impossible to carry out detection of an obstacle within the time interval T after previous detection was done, there occurs a delay in response or an obstacle moving at a high speed is missed.

The present invention is made in order to solve the above-mentioned problem, and it is therefore an object of the present invention to provide an obstacle detection device which can carry out detection of an obstacle moving at a high speed or detection of an obstacle in a case in which the obstacle detection device is mounted in a vehicle with a certain degree of precision.

In accordance with the present invention, there is provided an obstacle detection device including: one or more first ultrasonic sensors each for emitting an ultrasonic wave toward an obstacle; one or more second ultrasonic sensors each for detecting a reflected wave from the above-mentioned obstacle; a control unit for driving one of the above-mentioned one or more first ultrasonic sensors to cause the above-mentioned first ultrasonic sensor to emit an ultrasonic wave, for stopping the emission of the ultrasonic wave by the above-mentioned first ultrasonic sensor which has emitted the ultrasonic wave at a time that one of the above-mentioned second ultrasonic sensors detects a reflected wave from the above-mentioned obstacle, and for carrying out detection of the above-mentioned obstacle and a measurement of a distance to the above-mentioned obstacle from both a time that the above-mentioned control unit stops the emission of the above-mentioned ultrasonic wave and a time that the above-mentioned one second ultrasonic sensor which has detected the above-mentioned reflected wave cannot detect the above-mentioned reflected wave anymore.

Furthermore, in accordance with the present invention, there is provided an obstacle detection device including: a first ultrasonic sensor used exclusively for transmission, for emitting an ultrasonic wave toward an obstacle; one or more second ultrasonic sensors used exclusively for reception, each for detecting a reflected wave resulting from reflection of the above-mentioned emitted ultrasonic wave by the above-mentioned obstacle; and a control unit including a driving unit for generating a series of pulses having a duration corresponding to a time interval during which a burst wave is to be generated by the above-mentioned first ultrasonic sensor to drive the above-mentioned first ultrasonic sensor, a waveform shaping unit for amplifying and half-wave rectifying one or more signals received by the above-mentioned one or more second ultrasonic sensors, and for shaping a waveform of the above-mentioned one or more received signals by using a plurality of preset thresholds, a stopping unit for detecting a rise time of a logical addition of the one or more waveform-shaped signals of the above-mentioned one or more second ultrasonic sensors to stop the generation of the above-mentioned series of pulses, a measuring unit for detecting a pulse rise time from a waveform-shaped output signal of the above-mentioned first ultrasonic sensor and also detecting a pulse fall time from the logical addition of the one or more waveform-shaped output signals of the above-mentioned one or more second ultrasonic sensors to measure a time difference between the above-mentioned detected rise time and the above-mentioned detected fall time, and a determining unit for determining whether or not the above-mentioned obstacle exists, and a distance to the above-mentioned obstacle from the above-mentioned measured time difference.

Furthermore, in accordance with the present invention, there is provided an obstacle detection device including: two or more ultrasonic sensors for emitting an ultrasonic wave toward an obstacle, and for detecting a reflected wave resulting from reflection of the above-mentioned emitted ultrasonic wave by the above-mentioned obstacle; a switch for switching between the above-mentioned ultrasonic sensors sequentially with time; and a control unit including a driving unit for generating a series of pulses having a duration corresponding to a time interval during which a burst wave is to be generated by one of the above-mentioned ultrasonic sensors to drive this ultrasonic sensor, a waveform shaping unit for amplifying and half-wave rectifying a signal received by one of the above-mentioned ultrasonic sensors, and for shaping a waveform of the above-mentioned received signal by using a plurality of preset thresholds, a stopping unit for detecting a rise time of a logical addition of the above-mentioned waveform-shaped output signal of the above-mentioned one of the above-mentioned ultrasonic sensors to stop the generation of the above-mentioned series of pulses, a measuring unit for detecting a pulse rise time from a waveform-shaped output signal of the above-mentioned one of ultrasonic sensors and also detecting a pulse fall time from the logical addition of the above-mentioned waveform-shaped output signal of the above-mentioned one of ultrasonic sensors to measure a time difference between the above-mentioned detected rise time and the above-mentioned detected fall time, a determining unit for determining whether or not the above-mentioned obstacle exists, and a distance to the above-mentioned obstacle from the above-mentioned measured time difference, and a detecting unit for controlling the above-mentioned switch to select each of the above-mentioned ultrasonic sensors sequentially with time and carry out detection of an obstacle after the above-mentioned determining unit determines the above-mentioned distance.

ADVANTAGES OF THE INVENTION

Because the obstacle detection device in accordance with the present invention always carry out detection of an obstacle, the obstacle detection device can carry out detection of an obstacle moving at a high speed or detection of an obstacle in a case in which the obstacle detection device is mounted in a vehicle with a certain degree of precision and with a high degree of responsibility.

EMBODIMENTS OF THE INVENTION

Hereafter, in order to explain this invention in greater detail, the preferred embodiments of the present invention will be described with reference to the accompanying drawings. Embodiment 1.

Figure 1:
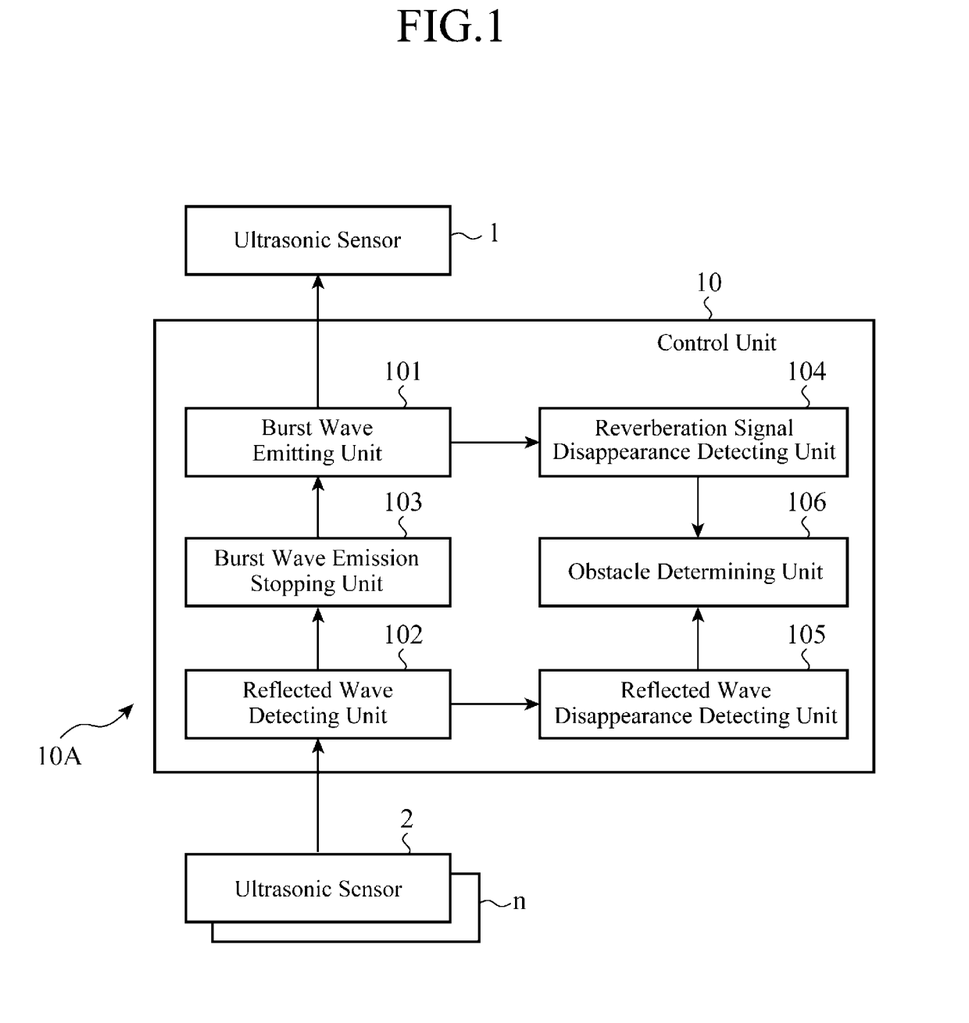
FIG. 1 is a block diagram showing the structure of an obstacle detection device in accordance with Embodiment 1 of the present invention.

FIG. 1 is a block diagram showing the structure of an obstacle detection device 10A in accordance with Embodiment 1 of the present invention. As can be seen from FIG. 1, the obstacle detection device 10A in accordance with Embodiment 1 is provided with a plurality of ultrasonic sensors 1 to n, and a control unit 10 for controlling these ultrasonic sensors 1 to n.

Each of the ultrasonic sensors 1 to n is of a type that transmits and receives an ultrasonic wave by using one ultrasonic transducer. For example, two or more ultrasonic sensors can be arranged horizontally and vertically in a front or rear portion of a vehicle. The plurality of ultrasonic sensors 1 to n should just be arranged in such a way that two or more ultrasonic sensors are extending horizontally and vertically. There are no restrictions in the number of ultrasonic sensors and how to arrange the ultrasonic sensors. In Embodiment 1, among the two or more ultrasonic sensor arranged, the ultrasonic sensor 1 is used for transmission of an ultrasonic wave as a first ultrasonic sensor while each of the ultrasonic sensors 2 to n is used for reception of a reflected wave as a second ultrasonic sensor.

Each of the ultrasonic sensors 1 to n is internally comprised of an ultrasonic transducer, a booster circuit, and a voltage amplification circuit. The ultrasonic transducer used for both transmission and reception is driven and made to oscillate by the booster circuit, so that an ultrasonic wave is emitted from the ultrasonic transducer. The ultrasonic wave then collides with an obstacle and is received as a reflected wave by the same ultrasonic sensors 1 to n, and the received ultrasonic wave passes along a path which is reverse to the path along which the ultrasonic wave had passed when emitted, and is amplified by the voltage amplification circuit and is captured by the control unit 10.

The control unit 10 has a function of driving one (e.g. the ultrasonic sensor 1) of the ultrasonic sensors 1 to n to cause this ultrasonic sensor to emit an ultrasonic wave, stopping the emission of the ultrasonic wave by the ultrasonic sensor, e.g. the ultrasonic sensor 1 at the time that one of the ultrasonic sensors 2 to n detects a reflected wave from the obstacle, and carries out detection of the obstacle and a measurement of the distance to the obstacle from both the time that the control unit stops the emission of the ultrasonic wave and the time that the control unit cannot detect the reflected wave anymore by using the ultrasonic sensors 2 to n.

To this end, the control unit 10 is constructed in such a way as to include a burst wave emitting unit 101, a reflected wave detecting unit 102, a burst wave emission stopping unit 103, a reverberation signal disappearance detecting unit 104, a reflected wave disappearance detecting unit 105, and an obstacle determining unit 106.

The burst wave emitting unit 101 drives the ultrasonic sensor 1 to cause this ultrasonic sensor to emit a burst wave, and the reflected wave detecting unit 102 detects a reflected wave resulting from reflection of the emitted burst wave by an obstacle by using the one or more ultrasonic sensors 2 to n.

The burst wave emission stopping unit 103 controls the burst wave emitting unit 101 to stop the emission of the burst wave after a fixed interval of time has elapsed since the reflected wave detecting unit 102 detected the reflected burst wave.

The reverberation signal disappearance detecting unit 104 detects the time that a reverberation signal from the ultrasonic sensor 1 disappears after the burst wave has been stopped, and the reflected wave disappearance detecting unit 105 detects the time that the reflected wave detected by the ultrasonic sensors 1 to n disappears.

The obstacle determining unit 106 calculates the time difference between the time detected and measured by the reverberation signal disappearance detecting unit 104, and the time detected and measured by the reflected wave disappearance detecting unit 105 to determine whether or not there is an obstacle and the distance to the obstacle.

Figure 2:
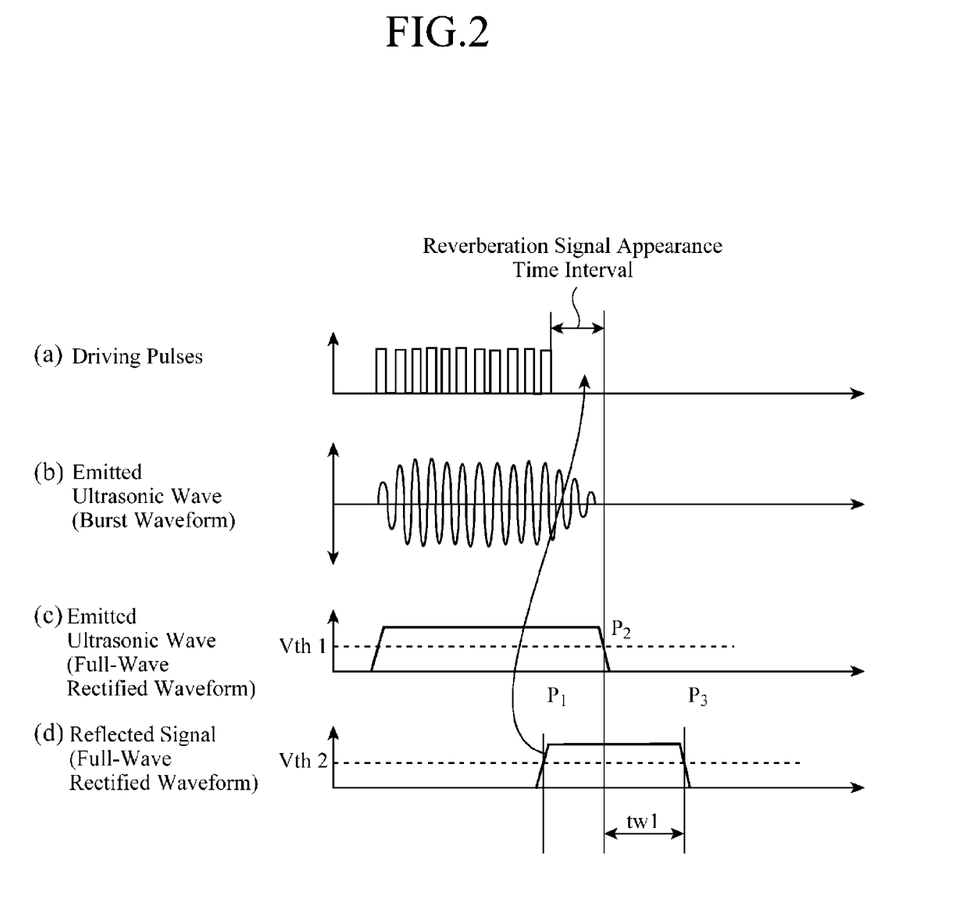
FIG. 2 is a timing chart showing the operation of the obstacle detection device in accordance with Embodiment 1 of the present invention.

FIG. 2 is a timing chart showing the operation of the obstacle detection device in accordance with Embodiment 1 of the present invention. FIG. 2(a) shows driving pulses, FIG. 2(b) shows an ultrasonic wave emitted (having a burst waveform), FIG. 2(c) shows an ultrasonic wave emitted (having a full-wave rectified waveform), and FIG. 2(d) shows a reflected signal (having a full-wave rectified waveform).

Hereafter, the operation of the obstacle detection device 10A in accordance with Embodiment 1 shown in FIG. 1 will be explained in detail with reference to the timing chart of FIG. 2.

The burst wave emitting unit 101 supplies driving pulses as shown in FIG. 2(a) to the ultrasonic sensor 1 to cause this ultrasonic sensor to emit a burst wave as shown in FIG. 2(b) toward an obstacle. A full-wave rectified waveform of the burst wave at this time is shown in FIG. 2(c).

A reflected wave resulting from reflection of the burst wave emitted from the ultrasonic sensor by the obstacle is detected by the one or more ultrasonic sensors 2 to n, and a full-wave rectified waveform of the reflected wave at this time is shown in FIG. 2(d).

At this time, the burst wave emission stopping unit 103 detects the rise time (point p1) of the reflected signal detected by the reflected wave detecting unit 102, and stops the transmission of the driving pulses at the time that the burst wave emission stopping unit detects the rise of the reflected signal.

On the other hand, the reverberation signal disappearance detecting unit 104 detects the time p2 (a reverberation signal appearance time interval) that the reverberation signal of the ultrasonic sensor 1 disappears after the emission of the ultrasonic wave has been stopped, and the reflected wave disappearance detecting unit 105 detects the fall time (point p3) of the reflected wave detected by the ultrasonic sensors 2 to n. Both the reverberation signal disappearance detecting unit and the reflected wave disappearance detecting unit inform the disappearance time and the fall time to the obstacle determining units 106.

The obstacle determining unit 106 which has received the disappearance time and the fall time measures the time difference tw1 between the disappearance time acquired by the reverberation signal disappearance detecting unit 104, and the fall time acquired by the reflected wave disappearance detecting unit 105 to determine whether or not there is an obstacle and the distance to the obstacle from this time difference tw1. A method, which the obstacle determining unit 106 uses, of determining whether or not there is an obstacle and the distance to the obstacle from the time difference acquired thereby is well known, and the explanation of the method will be omitted hereafter.

As mentioned above, in the obstacle detection device 10A in accordance with Embodiment 1, the control unit 10 drives one of the first ultrasonic sensors (e.g. the ultrasonic sensor 1) to cause this ultrasonic sensor to emit an ultrasonic wave, stops the emission of the ultrasonic wave by the first ultrasonic sensor at the time that one of the second ultrasonic sensors detects a reflected wave from an obstacle and carries out detection of the obstacle and a measurement of the distance to the obstacle from both the time that the control unit stops the emission of the ultrasonic wave and the time that the one of the second ultrasonic sensors cannot detect the reflected wave anymore. Therefore, the obstacle detection device can always carry out detection of an obstacle. As a result, the obstacle detection device can prevent a delay in its response from occurring when detecting an obstacle moving at a high speed or when the vehicle in which the obstacle detection device is mounted is traveling at a high speed, and can also prevent itself from missing an obstacle.

Embodiment 2

Figure 3:
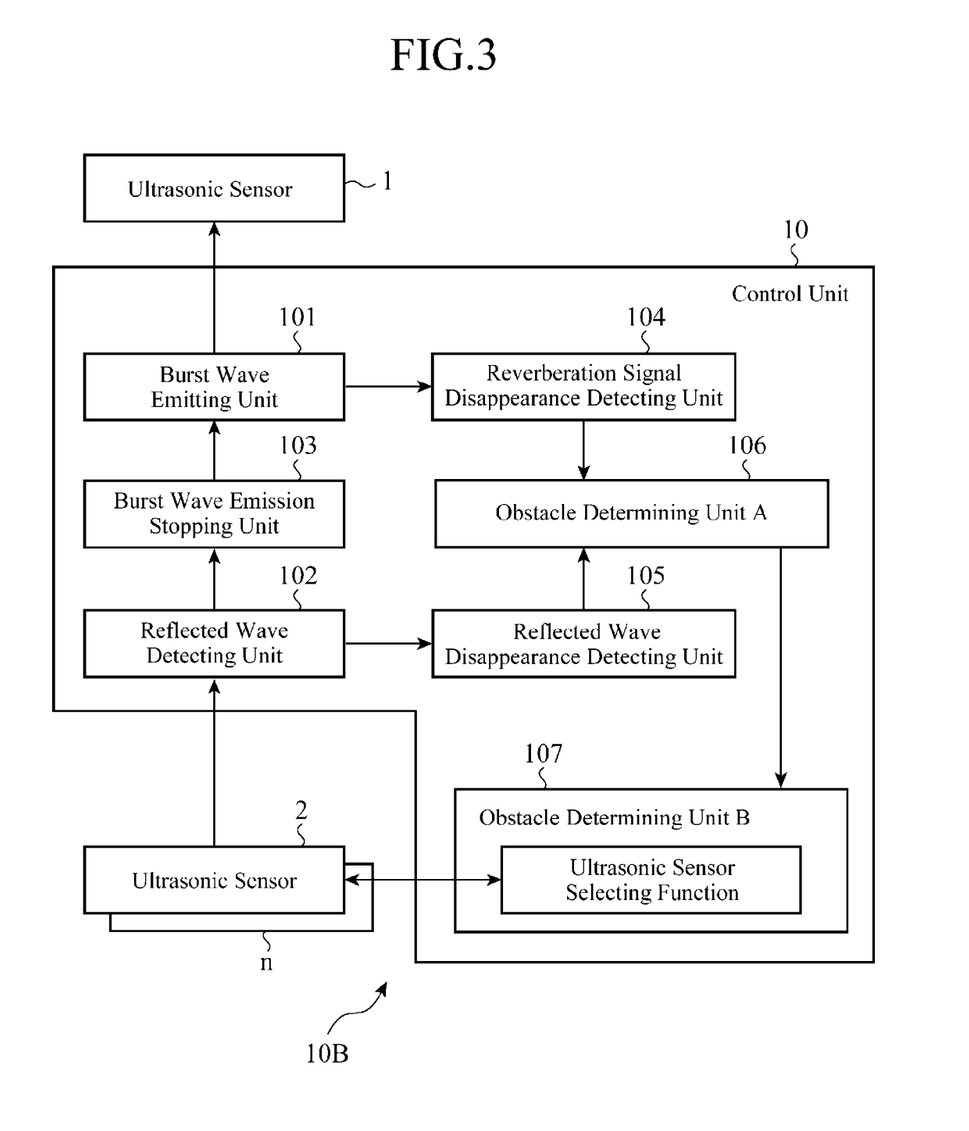
FIG. 3 is a block diagram showing the structure of an obstacle detection device in accordance with Embodiment 2 of the present invention.

FIG. 3 is a block diagram showing the structure of an obstacle detection device 10B in accordance with Embodiment 2 of the present invention.

As shown in FIG. 3, the obstacle detection device differs from that in accordance with Embodiment 1 shown in FIG. 1 in that an obstacle determining unit B 107 is added to a control unit 10. The obstacle determining unit B 107 has a function of driving one of ultrasonic sensors 1 to n (e.g. an ultrasonic sensor 2) in a mode for use in both transmission and reception by using an ultrasonic sensor selecting function disposed therein after an obstacle determining unit A 106 detects an obstacle, and then measuring the direction in which the obstacle exists and the distance to the above-mentioned obstacle. The other structural components of the obstacle detection device in accordance with this embodiment are the same as those in accordance with Embodiment 1.

Because after always carrying out detection of the existence of an obstacle at a high speed by using a burst wave, the obstacle detection device 10B in accordance with above-mentioned Embodiment 2 can carry out detection of the existing position of the obstacle with a first wave emitted from another ultrasonic sensor, the obstacle detection device can detect the direction in which the obstacle exists and the distance to the obstacle with an improved degree of precision and, hence, with a high degree of reliability.

Embodiment 3

Figure 4:
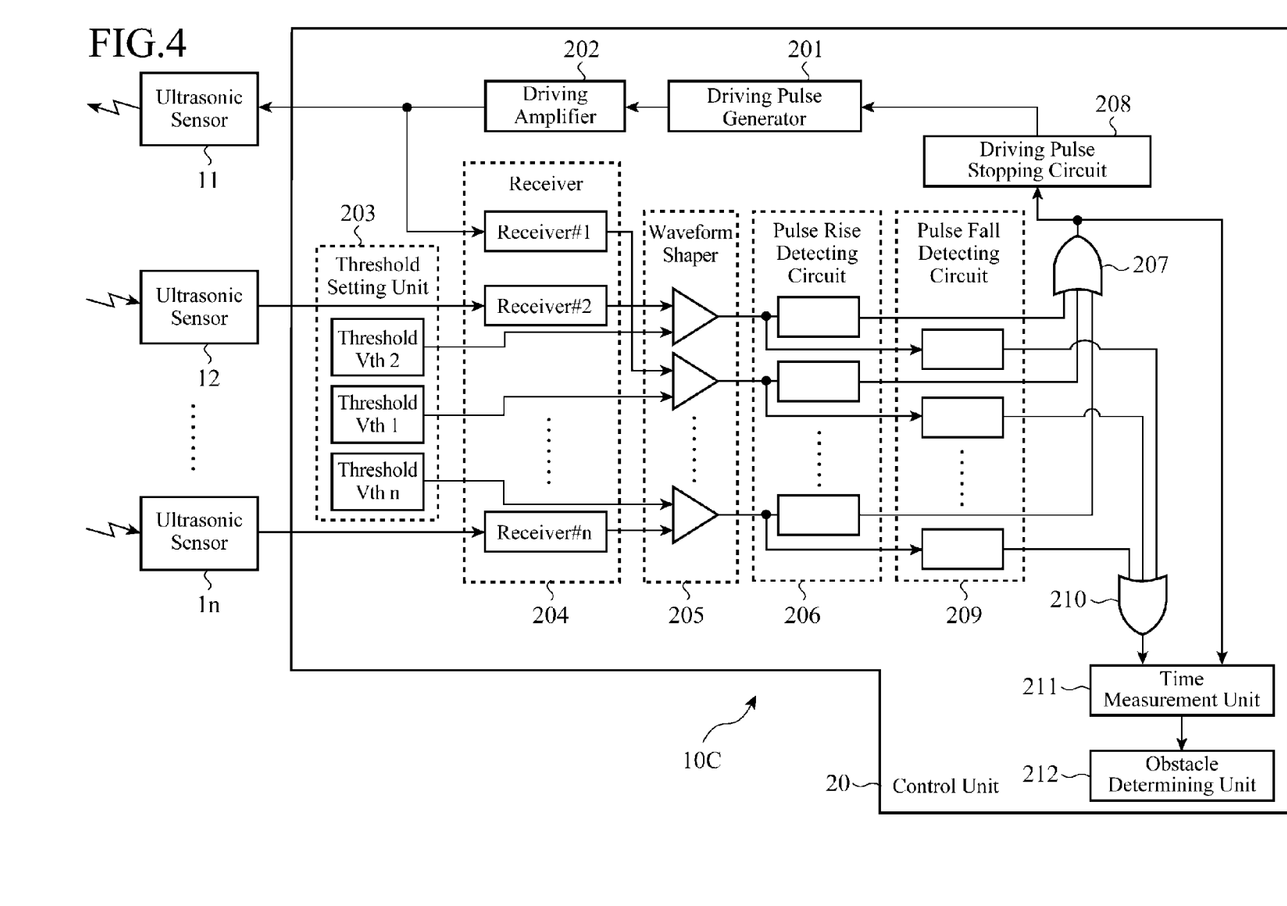
FIG. 4 is a block diagram showing the structure of an obstacle detection device in accordance with Embodiment 3 of the present invention.

FIG. 4 is a block diagram showing the structure of an obstacle detection device 10C in accordance with Embodiment 3 of the present invention.

The obstacle detection device 10C in accordance with Embodiment 3, which will be explained hereafter, is provided with a first ultrasonic sensor 11 used exclusively for transmission, for emitting an ultrasonic wave toward an obstacle, one or more second ultrasonic sensors 12 to 1n used exclusively for reception, for detecting a reflected wave resulting from reflection of the emitted ultrasonic wave by the obstacle, and a control unit 20.

The control unit 20 includes a driving pulse generator 201 and a driving amplifier 202 which are a driving unit for generating a series of pulses having a duration corresponding to a time period during which the ultrasonic sensor 11 used exclusively for transmission generates a burst wave.

The control unit 20 further includes a threshold setting unit 203, receivers 204 (receivers #1 to #n), and a waveform shaper 205 which are a waveform shaping unit for amplifying and half-wave rectifying a received signal received by each of the ultrasonic sensors 12 to 1n used exclusively for reception, and for shaping the waveform of the received signal amplified and half-wave rectified thereby by using a corresponding one of a plurality of preset thresholds Vth1 to Vthn.

The control unit 20 also includes a pulse rise detecting circuit 206, an OR circuit 207, a driving pulse stopping circuit 208, and a pulse fall detecting circuit 209 which are a stopping unit for detecting the rise time of a logical addition of waveform-shaped output signals from the ultrasonic sensors 12 to 1n used exclusively for reception to stop the generation of the series of pulses.

The control unit 20 further includes a pulse fall detecting circuit 209, an OR circuit 210, and a time measurement unit 211 which are a measuring unit for detecting the pulse fall time of the waveform-shaped output signal from the ultrasonic sensor 11 used exclusively for transmission and also detecting the pulse fall time of the logical addition of the waveform-shaped output signals from the ultrasonic sensors 12 to 1n used exclusively for reception to measure the time difference between the detected rise time and the detected fall time.

The control unit 20 also includes an obstacle determining unit 212 which is a determining unit for determining whether or not there is an obstacle and the distance to the obstacle from the measured time difference.

In the obstacle detection device 10C in accordance with Embodiment 3 having the above-mentioned structure, the control unit 20 operates the driving pulse generator 201 to cause this driving pulse generator to generate a series of pulses having a duration corresponding to a time period during which a burst wave is to be generated, and drives the ultrasonic sensor 11 used exclusively for transmission via the driving amplifier 202.

The control unit then amplifies and half-wave rectifies (detects) the received signal from each of the ultrasonic sensors 12 to 1n used exclusively for reception by using the receiver 204. Next, the waveform shaper 205 shapes the waveform of each of the outputs of the receiver 204 by using a corresponding one of the thresholds Vth1, Vth2, . . . , and Vthn which are set up by the threshold setting unit 203, and outputs the waveform-shaped outputs to the pulse rise detecting circuit 206 and the pulse fall detecting circuit 209.

The pulse rise detecting circuit 206 tries to detect the rise of each of the waveform-shaped output signals of the plurality of ultrasonic sensors 12 to 1n used exclusively for reception which are outputted from the waveform shaper 205, and starts the driving pulse stop circuit 208 via the OR circuit 207 at the time that the pulse rise detecting circuit detects at least one of the rises of the waveform-shaped output signals. At this time, the driving pulse stop circuit 208 controls the driving pulse generator 201 to stop the generation of the driving pulses.

On the other hand, the pulse fall detecting circuit 209 tries to detect the fall of each of the waveform-shaped output signals of the plurality of ultrasonic sensors 12 to 1n used exclusively for reception which are outputted from the waveform shaper 205, and starts time measurement by the time measurement unit 211 via the OR circuit 210 at the time that the pulse fall detecting circuit detects at least one of the falls of the waveform-shaped output signals.

When started, the time measurement unit 211 measures the time difference (tw1) between the time that the rise of at least one of the output signals of the ultrasonic sensors 12 to 1n which is detected by the pulse rise detecting circuit 206 occurs and the time that the fall of at least one of the output signals of the ultrasonic sensors which is detected by the pulse fall detecting circuit 209 occurs, and informs the time difference to the obstacle determining unit 212. The obstacle determining unit 212 determines whether or not there is an obstacle and the distance to the obstacle from this time difference (tw1).

The obstacle detection device 10C in accordance with above-mentioned Embodiment 3 uses the ultrasonic sensor 11 as one used exclusively for transmission, and also uses the ultrasonic sensors 12 to 1n as ones used exclusively for reception. To this end, the control unit 20 drives the ultrasonic sensor 11 used exclusively for transmission by supplying a series of pulses having a duration corresponding to a time period during which a burst wave is to be generated to the ultrasonic sensor 11 used exclusively for transmission, and amplifies and half-wave rectifies the received signal of each of the ultrasonic sensors 12 to 1n used exclusively for reception and shapes the waveform of the received signal by using the plurality of preset thresholds. The control unit 20 then detects the rise time of a logical addition of the waveform-shaped output signals of the ultrasonic sensors 12 to 1n to stop the supply of the driving pulses to the ultrasonic sensor 11 used exclusively for transmission. Next, the control unit detects the pulse fall time of the waveform-shaped output signal of the ultrasonic sensor 11 and also detects the pulse fall time of the logical addition of the waveform-shaped output signals of the ultrasonic sensors 12 to 1n used exclusively for reception to determine whether or not there is an obstacle and the distance to the obstacle according to the time difference measured from the detected rise time and the detected fall time.

Therefore, the obstacle detection device can always carry out detection of an obstacle. As a result, the obstacle detection device can prevent a delay in its response from occurring when detecting an obstacle moving at a high speed or when the vehicle in which the obstacle detection device is mounted is traveling at a high speed, and can also prevent itself from missing an obstacle.

Embodiment 4

Figure 5:
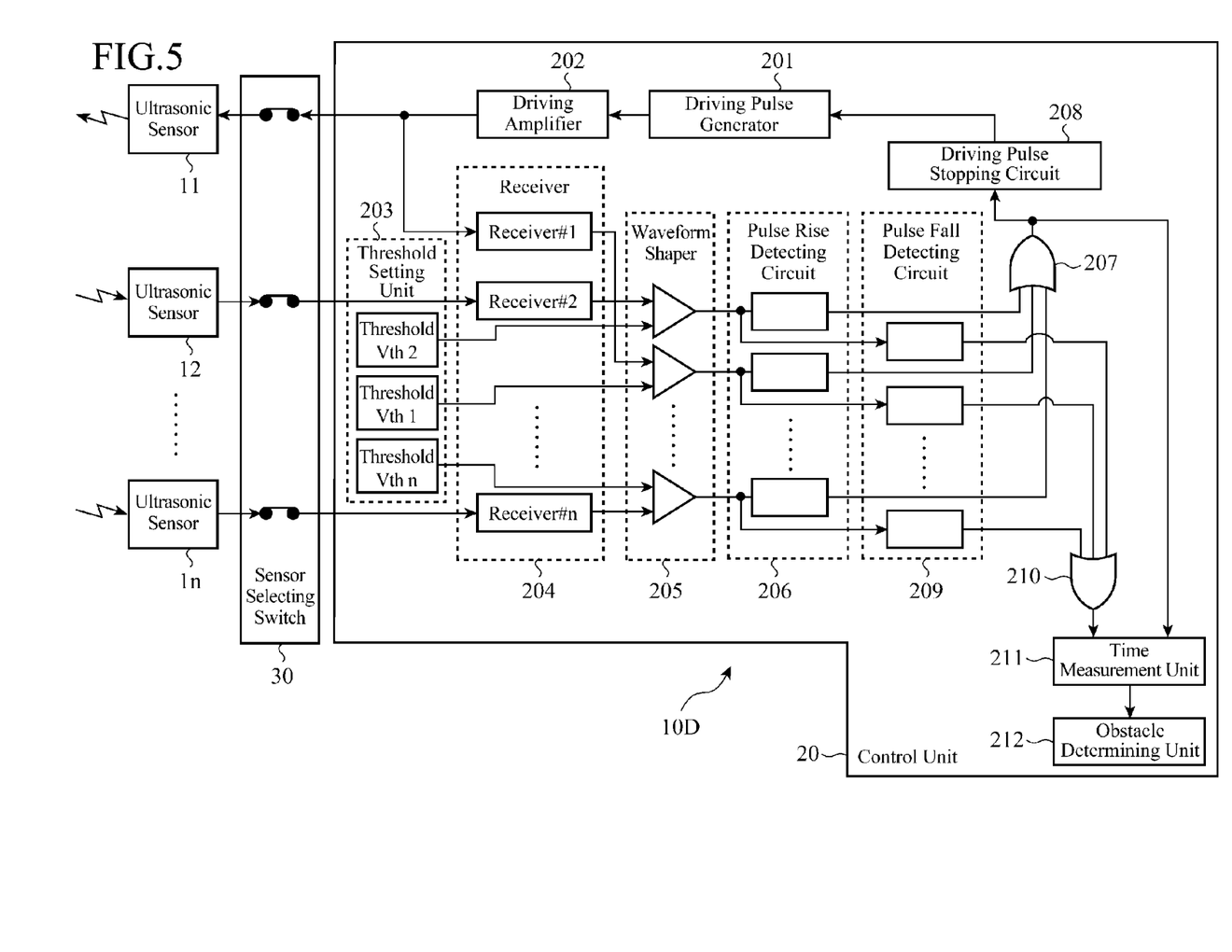
FIG. 5 is a block diagram showing the structure of an obstacle detection device in accordance with Embodiment 4 of the present invention.
Figure 6:
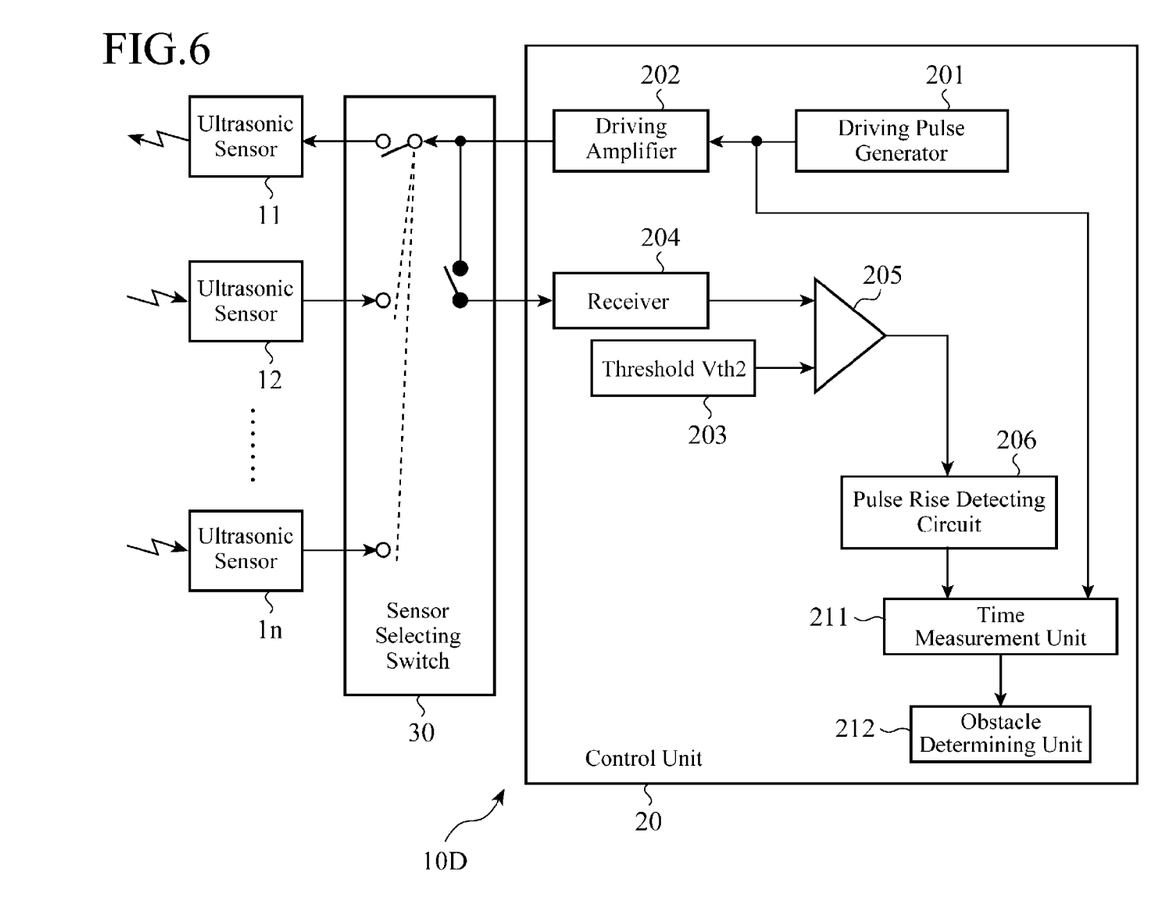
FIG. 6 is a block diagram showing the structure of an obstacle detection device in accordance with Embodiment 4 of the present invention.

FIGS. 5 and 6 are block diagrams showing the structure of an obstacle detection device 10D in accordance with Embodiment 4 of the present invention.

The obstacle detection device shown in FIG. 5 structurally differs from that in accordance with Embodiment 3 shown in FIG. 4 in that a sensor selecting switch 30, which is controlled by a control unit 20, for switching among ultrasonic sensors 11 to in sequentially with time is inserted between the ultrasonic sensors 11 to in and the control unit 20 as shown in FIG. 4. Furthermore, the ultrasonic sensors 11 to 1n are not used as first ones used exclusively for transmission or second ones used exclusively for reception, but are all used as ones for use in both transmission and reception, unlike in the case of Embodiment 3. The other structural components of the obstacle detection device in accordance with this embodiment are the same as those in accordance with Embodiment 3. The control unit 20, as well as the sensor selecting switch 30, can be installed in, for example, an ECU (electronic control unit) having a microprocessor as a control center thereof.

In the obstacle detection device shown in FIG. 5, after determining whether or not there is an obstacle and the distance to the obstacle by using an obstacle determining unit 212, the control unit 20 uses the ultrasonic sensors 11 to 1n as ones for use in both transmission and reception, and selects each of them sequentially with time via the sensor selecting switch 30 to carry out detection of the obstacle.

More specifically, when detecting an obstacle by using the obstacle determining unit 212, the control unit 20 causes the sensor selecting switch 30 to switch to a connection as shown in FIG. 6 and select each of the ultrasonic sensors 11-1n sequentially with time, and performs a normal obstacle detection operation.

The control unit 20 shown in FIG. 6 is in a state in which the control unit is made to select one of the ultrasonic sensors 11 to in for use in both transmission and reception by the sensor selecting switch 30. In this figure, the ultrasonic sensor 11 is selected.

Figure 7:
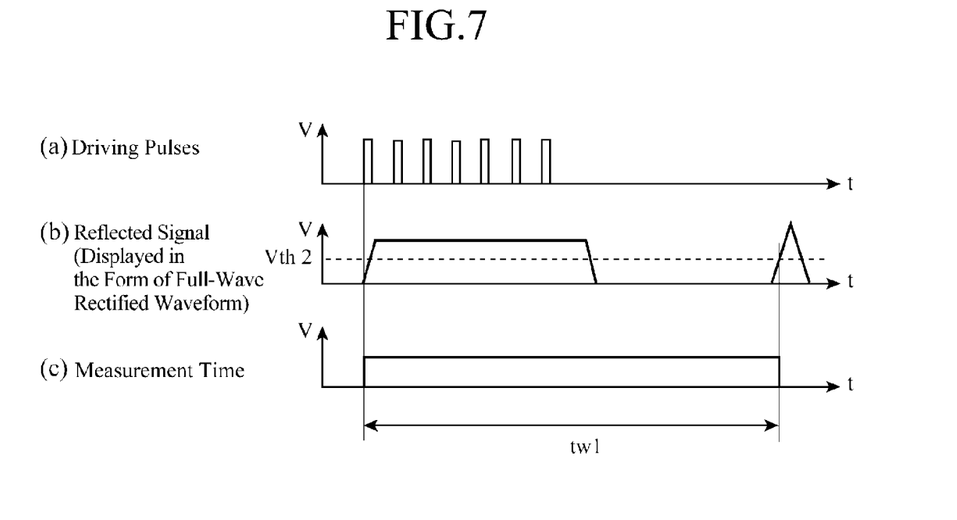
FIG. 7 is a timing chart showing the operation of the obstacle detection device in accordance with Embodiment 4 of the present invention.

FIG. 7 is a timing chart showing the operation of the obstacle detection device 10D in accordance with Embodiment 4 of the present invention, and FIG. 7(a) shows driving pulses, FIG. 7(b) shows a reflected wave (displayed in the form of a full-wave rectified waveform), and FIG. 7(c) shows a measurement time.

Hereafter, the operation of the obstacle detection device 10D in accordance with Embodiment 4 shown in FIG. 6 will be explained in detail with reference to the timing chart of FIG. 7.

More specifically, in the structure shown in FIG. 5, the ultrasonic sensor 11 is temporarily selected as an ultrasonic sensor used for transmission and reception by the sensor selecting switch 30 after the obstacle determining unit 212 determines whether or not there is an obstacle and the distance to the obstacle. As a result, the obstacle detection device shifts to the state shown in FIG. 6. In this state, in the control unit 20, a driving pulse generator 201 creates a pulse series signal, as shown in FIG. 7(a), having a duration corresponding to a time interval during which a burst wave is to be generated to drive the ultrasonic sensor 11 via a driving amplifier 202. The control unit then amplifies and half-wave rectifies (detects) a reflected wave (received signal), as shown in FIG. 7(b), which is received by the ultrasonic sensor 11 by using a receiver 204.

Next, a waveform shaper 205 shapes the waveform of the output of the receiver 204 by using a threshold Vth2 which is set up by a threshold setting unit 203, and the rise time of the output signal of the ultrasonic sensor 11 which is detected by a pulse rise detecting circuit 206 is informed to a time measurement unit 211. In addition, the time that the driving pulses are generated is informed from the driving pulse generator 201 to the time measurement unit 211, and the time measurement unit 211 measures the time difference (tw1 shown in FIG. 7(c)) between the time that the rise of the reflected wave is detected and the time that the first wave of the driving pulses is supplied, and restarts the obstacle determining unit 212. When restarted, the obstacle determining unit 212 determines the direction in which the obstacle exists and the distance to the obstacle from this time difference (tw1).

In the obstacle detection device 10D in accordance with above-mentioned Embodiment 4, after determining whether or not there is an obstacle and the distance to the obstacle, the control unit 20 using the ultrasonic sensors 11 to 1n as ultrasonic sensors for use in both transmission and reception, and selects the ultrasonic sensors sequentially with time and carries out detection of the obstacle. Therefore, after always carrying out detection of the existence of an obstacle by using a burst wave, the obstacle detection device 10D in accordance with Embodiment 4 can check the existence of the obstacle by using another ultrasonic sensor, the obstacle detection device can detect the direction in which the obstacle exists and the distance to the obstacle with an improved degree of precision and, hence, with a high degree of reliability.

Embodiment 5.

By the way, because an ultrasonic sensor has reverberation characteristics, by applying one or more driving pulses to an ultrasonic sensor used for transmission, and, after that, applying one or more driving pulses to the ultrasonic sensor in synchronization with the reverberation time of an ultrasonic wave emitted from the ultrasonic sensor to cause the ultrasonic sensor to emit a burst wave without applying driving pulses continuously to the ultrasonic sensor used for transmission, the power consumption of the ultrasonic sensor can be reduced and the power supply capacity required for the ultrasonic sensor can be reduced, and the capacitance of a capacitor in the ultrasonic sensor can be reduced.

In this case, the reverberation time means the time required for the energy of the signal to decrease by 60dB (1/100000) after the emission of the signal is stopped is defined as RT60 (the Reverberation Time 60).

The structure of an obstacle detection device in accordance with Embodiment 5 which will be explained hereafter follows that of the obstacle detection device 10A shown in FIG. 1 fundamentally, and differs from that of the obstacle detection device 10A in the structure of an ultrasonic sensor 1 used for transmission and a part of the structure of a control unit 10.

Figure 8:
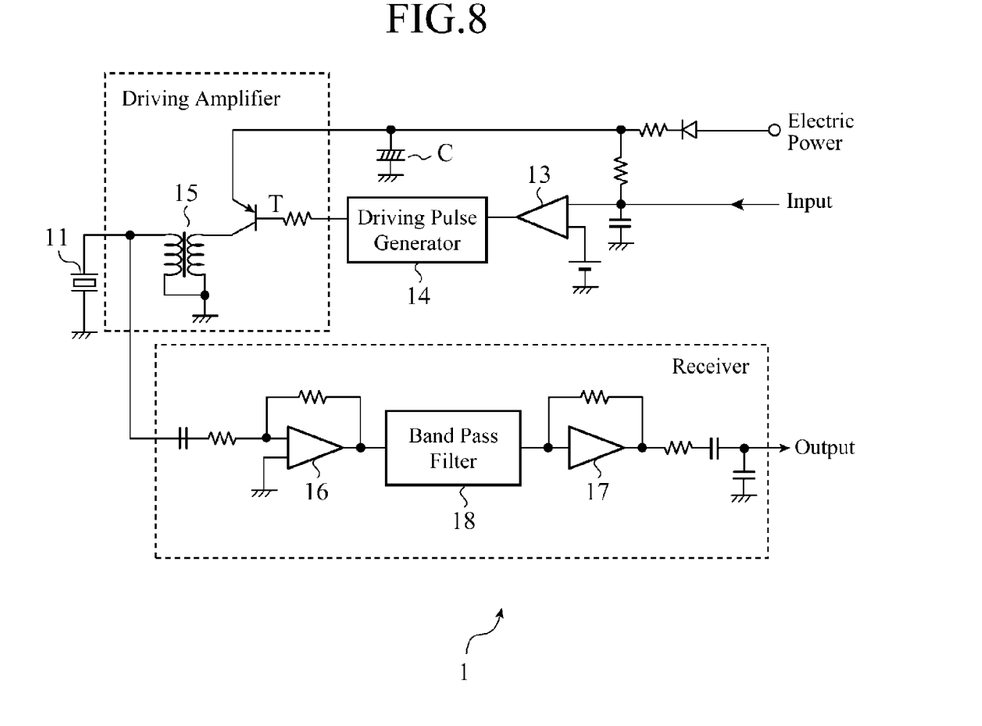
FIG. 8 is a circuit diagram showing the structure of an ultrasonic sensor for use in an obstacle detection device in accordance with Embodiment 5 of the present invention.

More specifically, the ultrasonic sensor 1 used for transmission is comprised of an ultrasonic sensor 11, a high-capacitance capacitor C, a differential amplifier 13, a driving pulse generator 14, a booster circuit 15, voltage amplification circuits 16 and 17 as a receiver, and a band pass filter 18, as shown in FIG. 8.

In the above-mentioned structure, the high-capacitance capacitor C is charged by an external power supply except when the ultrasonic sensor emits an ultrasonic wave. The driving pulse generator 14 operates from this high-capacitance capacitor C as a power source in response to an emission command signal to command emission of an ultrasonic wave which is inputted from the not-shown control unit 10 via the differential amplifier 13 to generate driving pulses. The series of driving pulses generated by the driving pulse generator 14 are controlled by the emission command signal created by the control unit 10 so that the number of pulses which are applied to the ultrasonic sensor intermittently is adjusted.

The series of driving pulses generated by the driving pulse generator 14 are supplied to the booster circuit 15 via a transistor T which constructs the driving amplifier, and the ultrasonic sensor 11 is made to vibrate from a voltage induced in the secondary winding of the booster circuit 15 to generate an ultrasonic wave. When emitting (outputting) this ultrasonic wave, the ultrasonic sensor amplifies the generated ultrasonic wave by using the voltage amplification circuit 16, and further amplifies a signal band-limited by the band pass filter 18 by using the voltage amplification circuit 17 and outputs this amplified signal.

Figure 9:
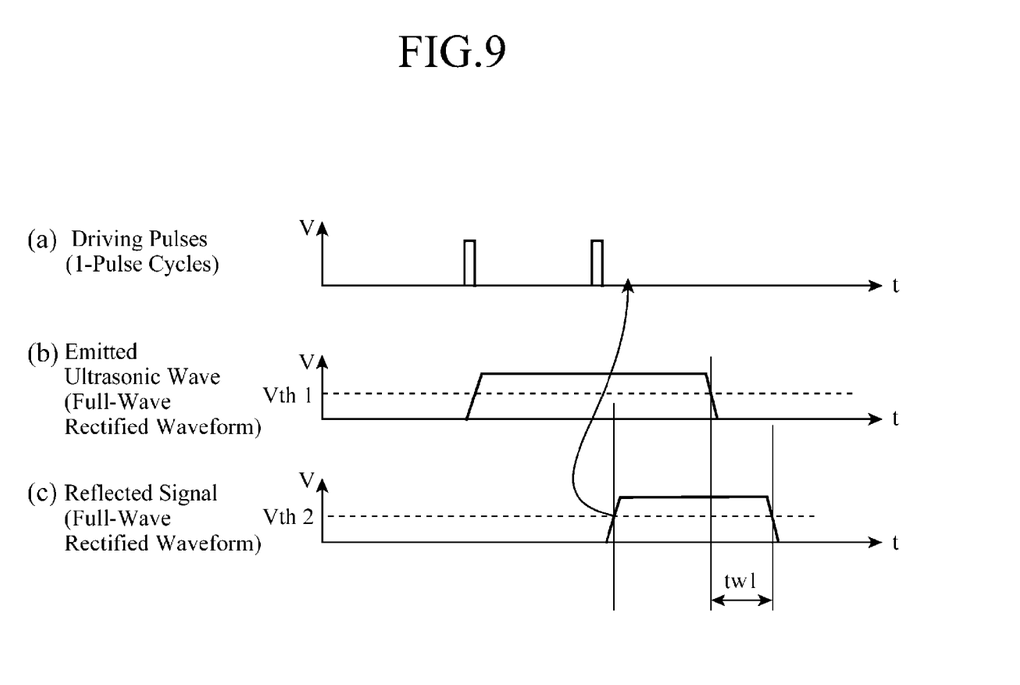
FIG. 9 is a timing chart showing the operation of the obstacle detection device in accordance with Embodiment 5 of the present invention.

FIG. 9 is a timing chart showing the normal operation of the obstacle detection device in accordance with Embodiment 5 of the present invention, and FIG. 9(a) shows driving pulses, FIG. 9(b) shows a pulse emitted (having a full-wave rectified waveform), and FIG. 9(c) shows a reflected signal (having a full-wave rectified waveform).

Referring to FIG. 9, the control unit 10 drives a specific one of the ultrasonic sensors by using continuous driving pulses as shown in FIG. 9(a) to emit an ultrasonic wave as shown in FIG. 9(b), like that according any of Embodiments 1 and 2 whose operation timing is shown in FIG. 2. The control unit then stops the emission of the ultrasonic wave by the specific ultrasonic sensor at the time that one of ultrasonic sensors used for reception detects a reflected wave (FIG. 9(c)) from an obstacle, and carries out detection of an obstacle and a measurement of the distance to the obstacle from the time difference (tw1) between the time that the control unit stops the emission of the ultrasonic wave and the time that the ultrasonic sensor used for reception cannot detect the reflected wave anymore.

Figure 10:
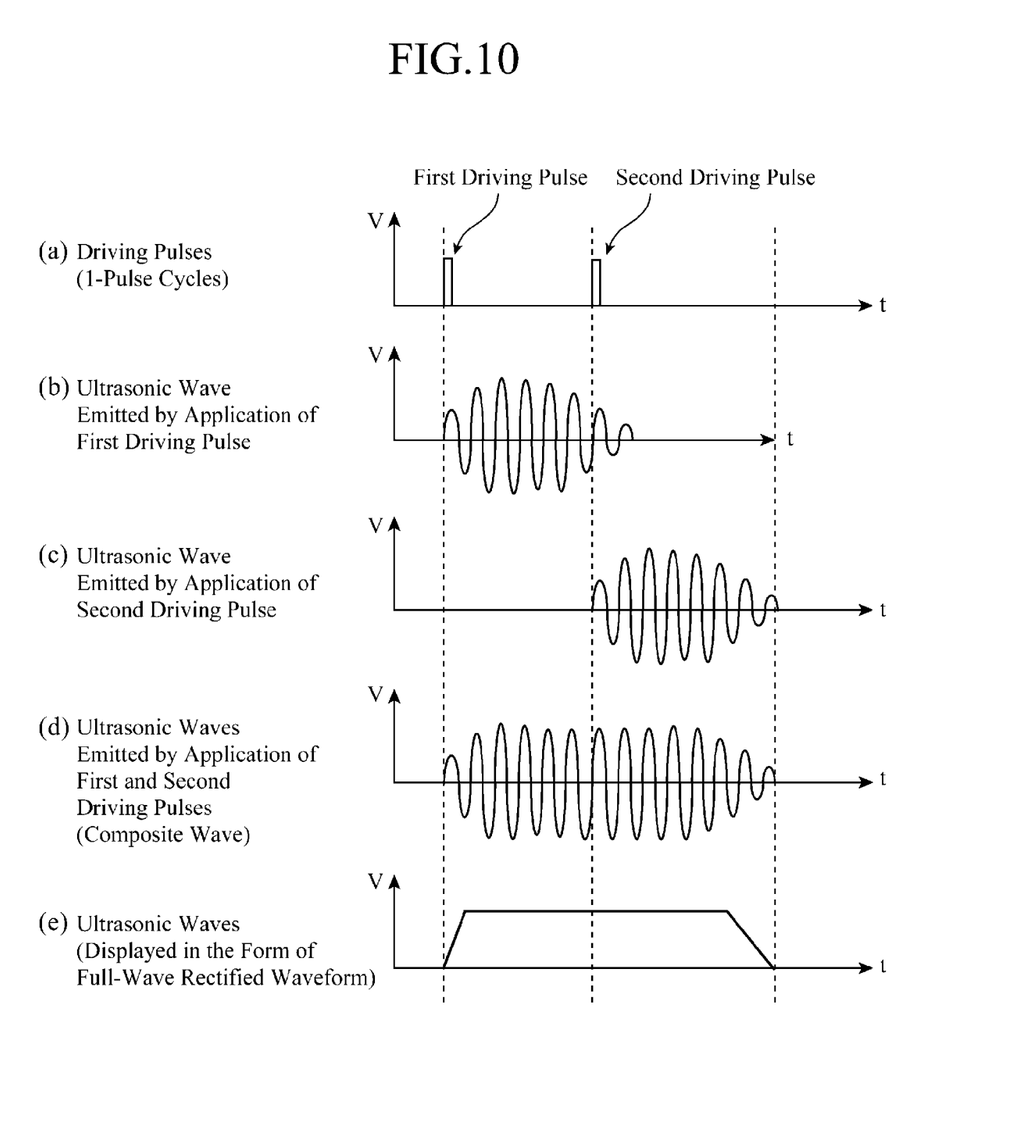
FIG. 10 is a timing chart showing the operation (one pulse cycle) of the obstacle detection device in accordance with Embodiment 5 of the present invention.
Figure 11:
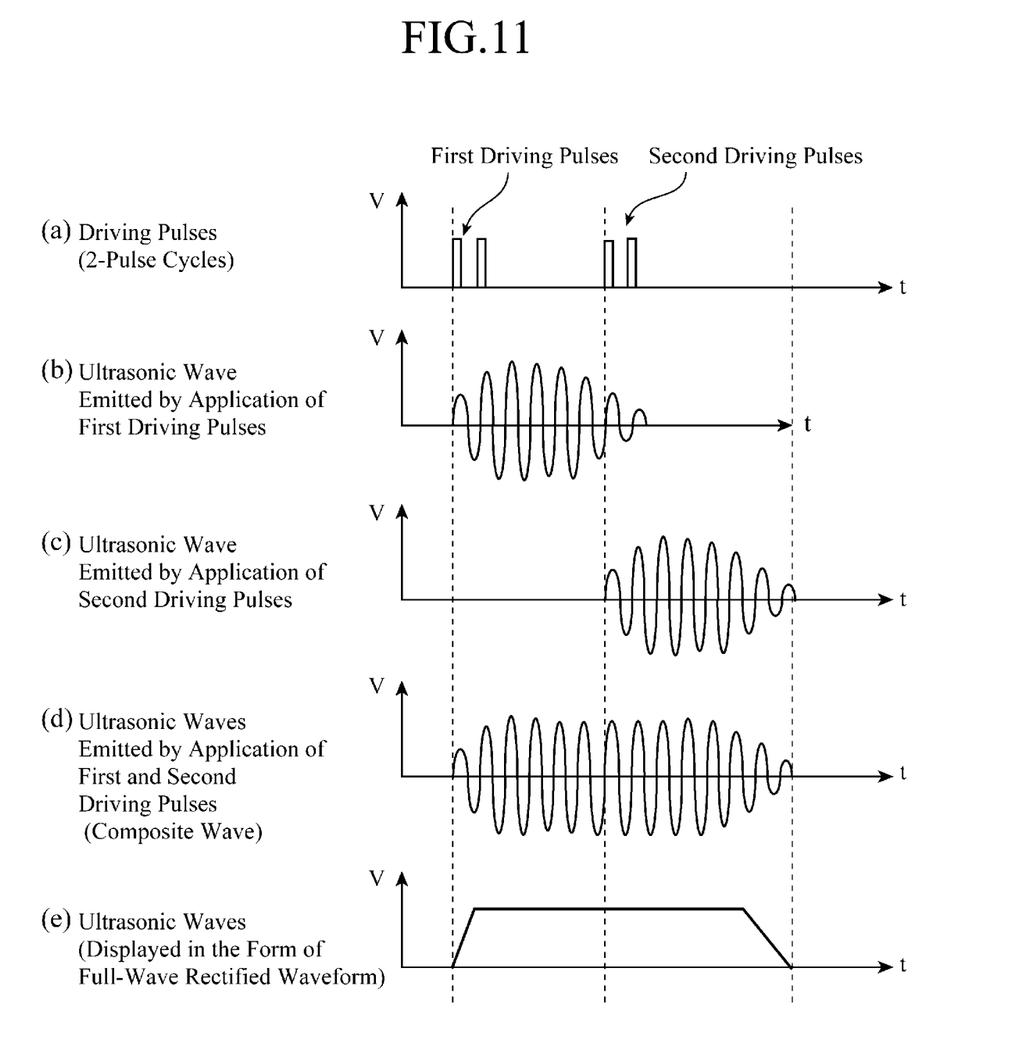
FIG. 11 is a timing chart showing the operation (two-pulse cycle) of the obstacle detection device in accordance with Embodiment 5 of the present invention.

FIGS. 10 and 11 are timing charts showing the transmitting operation of the obstacle detection device in accordance with Embodiment 5 of the present invention, and show a case of 1-pulse cycles (FIG. 10) and a case of 2-pulse cycles (FIG. 11). In these figures, (a) shows driving pulses, (b) shows an ultrasonic wave emitted by application of a first driving pulse to the ultrasonic sensor, (c) shows an ultrasonic wave emitted by application of a second driving pulse to the ultrasonic sensor, (d) shows a composite wave which is the addition of the ultrasonic wave emitted by application of the first driving pulse to the ultrasonic sensor and the ultrasonic wave emitted by application of the second driving pulse to the ultrasonic sensor, and (e) shows the emitted ultrasonic wave displayed in the form of a full-wave rectified waveform.

As shown in FIGS. 10 and 11, the control unit 10 does not have to always apply driving pulses to the ultrasonic sensor 1 used for transmission continuously by applying the one or more first driving pulses to the ultrasonic sensor 1, and, after that applying the one or more second driving pulses to the ultrasonic sensor 1 in synchronization with the reverberation time of the ultrasonic wave emitted from the ultrasonic sensor 1 used for transmission to cause the ultrasonic sensor to emit a burst wave.

As a result, the power consumption of the ultrasonic sensor can be reduced and the power supply capacity required for the ultrasonic sensor can be reduced, and the capacitance of the capacitor C shown in FIG. 8 in the ultrasonic sensor can be reduced.

The obstacle detection device in accordance with above-mentioned Embodiment 5 does not have to always apply driving pulses to the ultrasonic sensor 1 used for transmission continuously by applying the one or more first driving pulses for driving the ultrasonic sensor to this ultrasonic sensor, and, after that, applying the one or more second driving pulses to the ultrasonic sensor in synchronization with the reverberation time of the ultrasonic sensor used for transmission to cause the ultrasonic sensor 1 used for transmission to emit a burst wave. As a result, the power consumption of the ultrasonic sensor can be reduced and the power supply capacity required for the ultrasonic sensor can be reduced, and the capacitance of the capacitor in the ultrasonic sensor can be reduced.

Therefore, the obstacle detection device can contribute to a reduction in the cost, a reduction in the packaging area of the printed circuit board, and a reduction in the volume of the sensor case.

All of the functions which the control unit 10 (20) shown in FIG. 1, 3, 4, 5, or 6 has can be implemented via software, or at least a part of the functions can be implemented via hardware.

For example, the data processing, which is carried out by the control unit 10, of driving a specific ultrasonic sensor among ultrasonic sensors to cause the specific ultrasonic sensor to emit the ultrasonic wave, stopping the emission of the ultrasonic wave by the specific ultrasonic sensor at the time that one of ultrasonic sensors used for reception detects a reflected wave from an obstacle, and carrying out detection of an obstacle and a measurement of the distance to the obstacle from both the time that the control unit 10 stops the emission of the ultrasonic wave and the time that the control unit 10 cannot detect the reflected wave anymore by using the ultrasonic sensor used for reception can be implemented by one or more programs running on a computer, or at least a part of the data processing can be implemented via hardware.

Industrial Applicability

As previously explained, in order to always carry out detection of an obstacle, and carry out detection of an obstacle moving at a high speed or detection of an obstacle in a case in which the obstacle detection device is mounted in a vehicle with a certain degree of precision and with a high degree of responsibility, an obstacle detection device in accordance with the present invention is constructed in such a way as to include: one or more first ultrasonic sensors each for emitting an ultrasonic wave toward an obstacle; one or more second ultrasonic sensors each for detecting a reflected wave from the obstacle; and a control unit for driving one of the one or more first ultrasonic sensors to cause the first ultrasonic sensor to emit an ultrasonic wave, for stopping the emission of the ultrasonic wave by the first ultrasonic sensor which has emitted the ultrasonic wave at a time that one of the second ultrasonic sensors detects a reflected wave from the obstacle, and for carrying out detection of the obstacle and a measurement of a distance to the obstacle from both the time that the control unit stops the emission of the ultrasonic wave and the time that the one second ultrasonic sensor which has detected the reflected wave cannot detect the reflected wave anymore. Therefore, the obstacle detection device in accordance with the present invention is suitable for use not only in a vehicle, but also in any type of moving object.

The invention claimed is:

1. An obstacle detection device comprising:
    a first ultrasonic sensor that emits an ultrasonic wave toward an obstacle;
    a second ultrasonic sensor that detects a reflected wave from said obstacle; and
    control circuitry that supplies driving pulses to drive said first ultrasonic sensor to emit an ultrasonic wave, stops supplying the driving pulses to the first ultrasonic sensor to stop the emission of the ultrasonic wave by said first ultrasonic sensor at a first time that said second ultrasonic sensor detects a reflected wave from said obstacle, detects a emission level of the ultrasonic wave emitted from the first ultrasonic sensor, detects a second time that the emission level has decreased to a predetermined level, detects a third time that the reflected wave disappears, and carries out detection of said obstacle and a measurement of a distance to said obstacle from a period of time between the second time and the third time.

2. The obstacle detection device according to claim 1, further comprising:
    a third ultrasonic sensor,
    wherein after detecting said obstacle, said control circuitry drives said third ultrasonic sensor in a mode for use in both transmission and reception, and measures a direction in which said obstacle exists, and the distance to said obstacle.

3. The obstacle detection device according to claim 1, wherein said control circuitry applies one or more first driving pulses to said first ultrasonic sensor, and after that, applying one or more second driving pulses to said first ultrasonic sensor in synchronization with a reverberation time of the ultrasonic wave emitted from said first ultrasonic sensor.

* * * * *